July 16, 1957 G. H. TABER 2,799,094
APPARATUS FOR DETERMINING COMPARATIVE STEERING
ANGLES OF VEHICLE WHEELS
Original Filed May 28, 1952 2 Sheets-Sheet 1
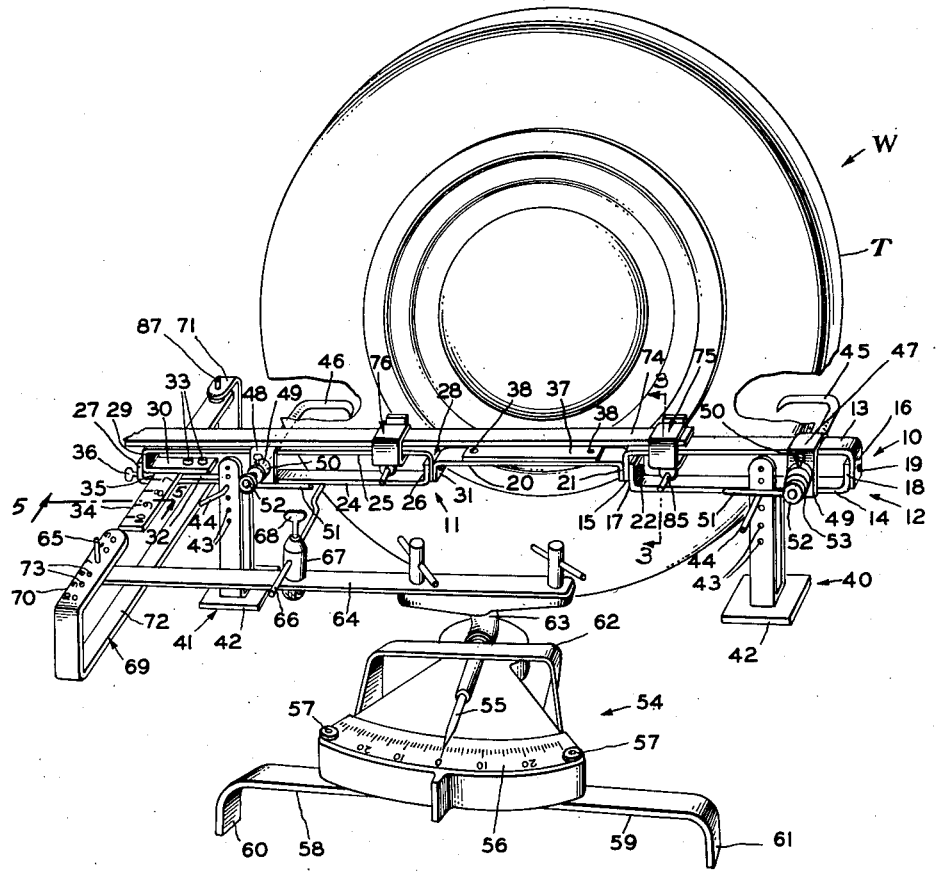
Fig. 1.
Fig. 2.
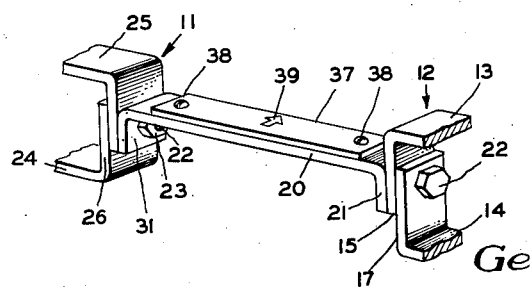
INVENTOR
George H. Taber
BY Shoemaker + Mattare
ATTORNEYS

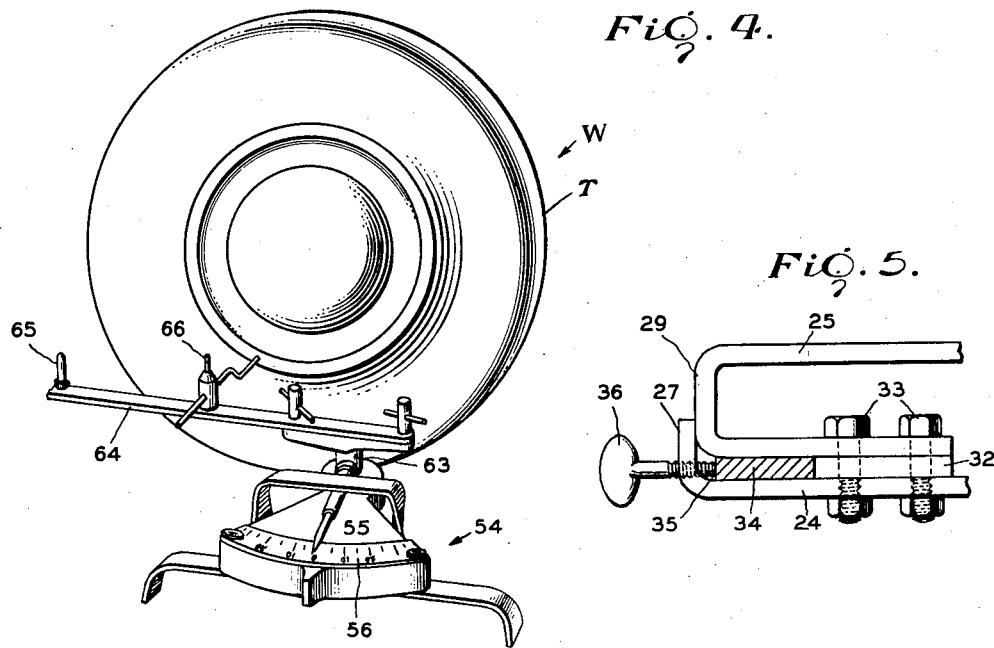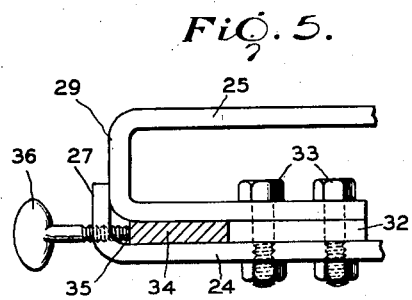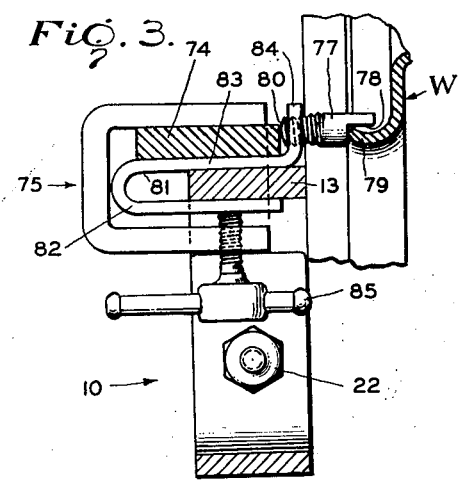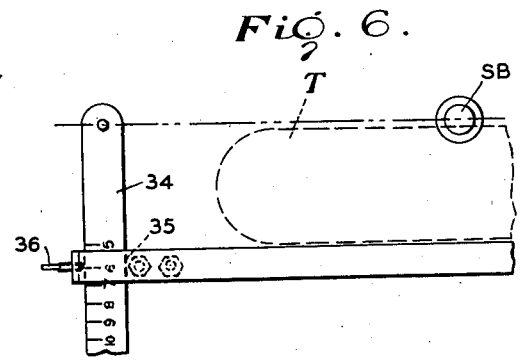
INVENTOR
George H. Taber
BY Shoemaker & Mattare
ATTORNEYS

United States Patent Office

2,799,094
APPARATUS FOR DETERMINING COMPARATIVE STEERING ANGLES OF VEHICLE WHEELS

George H. Taber, Elmira, N. Y.

Original application May 28, 1952, Serial No. 290,416, now Patent No. 2,737,728, dated March 13, 1956. Divided and this application September 18, 1953, Serial No. 380,912

5 Claims. (Cl. 33—203.15)

The present invention relates to improvements in vehicle alignment apparatus and more particularly to improvements in indicating devices useful in testing and correcting vehicle wheel alignment.

This present application is a division of my copending application Serial No. 290,416, now Patent No. 2,737,728, filed May 28, 1952.

A primary object of the present invention is to provide an improved means for indicating steering angles and wherein the means includes a pointer indicator laterally displaced from the steering wheel to be tested and a parallel linkage interconnecting the steering wheel with the pointer so as to indicate the angular positioning of the steering wheel about its spindle bolt.

Another object of the present invention is to provide an improved steering angle indicating device wherein accurate indications of the angle of turning of the wheel are achieved.

Still another object of the present invention is to provide an improved steering angle indicating device which is so interconnected with the steering wheel as to have horizontal planar pointer movement notwithstanding the deviation in angular relation between the steering wheel and the horizontal supporting surface.

A still further object of the present invention is to provide an improved steering angle indicating device which can accommodate vehicle tires of different sizes.

Another object of the present invention is to provide an improved vehicle steering angle indicating device which can be easily mounted for use and easily removed thereafter and which will be of simple construction and thus economical of manufacture.

Various other objects and advantages will become apparent from the detailed description to follow. The best form in which I have contemplated applying my invention is clearly illustrated in the drawings wherein:

Fig. 1 is a perspective view showing the steering angle indicating device as applied to one of the steering wheels of a vehicle (not shown);

Fig. 2 is a perspective view of a portion of the master support frame, showing the pointer adapted to be aligned with the line through the wheel centers;

Fig. 3 is a cross-sectional view as taken substantially on the plane of lines 3—3 of Fig. 1;

Fig. 4 is a perspective view showing the steering angle indicator as applied to a wheel to indicate wheel run-out;

Fig. 5 is a sectional view taken substantially along the plane of line 5—5 of Fig. 1 and showing the manner in which the slide bar of the parallel linkage for the steering angle indicator is mounted on its support; and Fig. 6 is a plan view showing the vehicle wheel in dotted lines and showing the relationship between the spindle bolt and the support frame and slide bar.

In the embodiment of my invention shown in the accompanying drawings, by way of example, it will be understood that a pair of the steering angle indicators, one associated with each of the steering wheels of a vehicle, is contemplated for actual practice. The steering angle indicators are operated by a parallel linkage system attached to main support frames in a manner to be described in detail hereinafter. The main support frames are rigidly connected to the steering wheels during the alignment procedure, and have the parallel linkages operatively associated therewith. The main support frames in addition carry elongated bars which project forwardly of the vehicle and constitute a part of the alignment means as disclosed and claimed in my copending application Serial No. 290,416, now Patent No. 2,737,728, filed May 28, 1952.

Looking now at Fig. 1, it will be seen that the master support frame or assembly designated generally by the numeral 10 is comprised of opposed ends 11 and 12 joined by the intermediate spacer bar 20. The end section 12 is comprised of upper and lower angulated bars 13 and 14 which have right angular end portions 15, 16 and 17, 18. The angular portions 15 and 16 of the upper bar overlie the right angular portions 17 and 18 of the lower bar and are rigidly fastened at the outer end by rivets 19 or the like and at the opposite end to the downturned end 21 of spacer bar 20 by the bolt 22 and nut 23, as seen best in Fig. 2. The opposing end section 11 is constructed of two bars 24 and 25 of which the lower bar 24 has right angular end portions 26 and 27 and the upper bar 25 is provided at one end with a right angular portion 28. The other end of the bar 25 is bent downward as at 29 and inward as at 30. The end 26 overlies the end 28 and together they are fastened to the downturned end 31 of the spacer bar 20 by a bolt 22 and nut 23, again referring to Fig. 2. The turned up end 27 of the lower bar 24 overlies the angular portion 29 of the upper bar 25 and the inturned end 30 is separated from the bar 24 by a spacer 32. See Fig. 5. Bolts 33 are engaged through apertures in the inturned end 30, bar 24 and spacer 32 to hold the same together. A graduated slide bar 34 is transversely slidably engaged in the opening 35 and adjustably held in position by a thumb screw 36.

The intermediate spacer bar 20 has a plate 37 secured thereto by screws 38 and is provided with an indicia arrow 39 the purpose of which will be described hereinafter.

The main frame supporting elements 40 and 41 are U-shaped and each has a foot 42 secured to the lower end thereof and a series of holes 43 are provided in the supporting elements for receiving pins 44 therethrough for the purpose of supporting the opposing ends 11 and 12 of each support assembly.

The main frame 10 is clamped to and supported by the tire T of the steering wheel W by means of claws 45 and 46. Screw threaded shank extensions of the claws pass through the end sections of the main frame and are received through apertures in the slide carriers 47 and 48. Each slide carrier is comprised of a U-shaped bracket slidably embracing one of the end portions 11 or 12. The threaded shank of the claw passing through the carrier 47 or 48 has a washer 49 and a knurled thumb tightening nut 50 is engaged on the threaded shank and bears against the slide carrier to draw the claw end into clamping engagement with the tire T. The shank extension has a claw relator rod 51 mounted thereon by means of the sleeve 52. The claw relator rod is positioned in the same plane as the claw and is held in that position by means of a set screw 53 in the sleeve 52. It will thus be seen that the claw can be engaged with a point on the inside surface of the tire opposite the portion of the tire between the upper and lower bars of the opposing ends of the support assembly for stability purposes.

In order to accurately indicate the degree of turn of each wheel, I provide a steering angle indicator 54, triangular in shape, which has a pointer 55 pivoted at the apex of the triangle and overlying the arcuate scale 56 attached by the screws 57. The scale segment is laid off in degrees on either side of the center, at which point is the zero marking indicating a straight-ahead condition of the vehicle steering wheels. The indicator is supported and remains stationary on the floor by a pair of front legs 58 and 59 downturned at their ends 60 and 61, and by a single rear leg, not visible, so as to maintain the indicator horizontally disposed. I have also provided a handle 62 for convenience in moving the indicator to the desired relationship with the wheel. The pointer has a substantially T-shaped element 63 upstanding therefrom to which is rigidly secured an actuating arm 64. The free end of actuating arm 64 is provided with an upstanding dowel pin 65. An adjustable angulated contact rod 66 is pivotally carried by the boss 67 intermediate the ends of actuating arm 64 and held in adjusted position by the thumb screw 68. The elongated connecting link 69 is a bar bent back as at 70 and 71 in spaced parallel relation to the main portion 72. The portion 71 at the inner end is provided with an aperture to loosely receive a dowel pin 87 on the slide bar 34. The outer portion 70 of the link 69 is elongated and contains a series of apertures 73 through any one of which may be passed the dowel pin 65 of actuating arm 64, depending primarily upon the size of the tire.

First operation

In testing for proper wheel alignment, it is first necessary to test the wheel for run-out or wobble. The wheel is raised so as to be freely rotated and my steering degree indicator 54 is placed adjacent the wheel with the adjustable contact rod 66 bearing against the tire rim bead, as shown in Fig. 4. With the adjustable contact rod 66 bearing against the bead and the pointer resting at zero, the wheel is slowly rotated. As the wheel rotates, any wobble inherent therein will be indicated by the action of the pointer 55, relative to the scale 56 of the steering degree indicator. After both the right and left steering wheels have been tested in this manner and the wobble, if present, corrected, the vehicle is situated on a floor which is known to be level.

The steering wheels are set in a substantially straight-ahead position by manipulation of the driver's hand steering wheel. It will, of course, be understood that perfect straight-ahead positioning of the steering wheels is not requisite to proper utilization of the apparatus of my present invention.

Mounting

The master support frame 10 is positioned at the proper height relative to the vehicle wheel by means of the pins 44 which have been placed in the proper apertures in the supports 40 and 41. The master support frame 10 rests on the pins 44 between the upright portions of the supports 40 and 41 and the upper and lower bars 13, 14 and 24, 25 lie in contact with, or against, the side wall of the tire. With reference to Figs. 1 and 3, bar 74 is supported on main frame 10 by C-clamps 75 and 76 and maintained absolutely parallel to the wheel of the vehicle by spacers 77 of predetermined length, one end of which is partially cut away at 78 to rest on and contact the tire bead 79. The opposite end 80 is an abutment for bar 74. The spacers 77 are slidably positioned relative to the main frame 10 and the bar 74 by means of the members 81 each of which has a substantially U-shaped portion 82, with the free end of one of the legs 83 being bent upwardly at 84. The spacers 77 are each engaged in a threaded aperture in one of the upstanding ends 84. The U-shaped portion 82 slidably embraces one of the bars 13, 25 and C-clamps 75, 76 clamp the bar 74 and members 81 to the main frame by means of the clamping screw 85. With the supports in place, the arrow 39 is positioned at the vertical central plane of the vehicle wheel with the claw portions of the clamps 45 and 46 engaging the rear wall of the tire. The rods 51 are then pivoted to position the claws and the thumb nuts 50 are rotated, drawing the master support frame 10 to the vehicle wheel for rigid attachment thereto. After the master support frame 10 has been securely fastened to the vehicle wheel, the supports 40 and 41 may be removed.

Second operation

The steering angle indicator 54 is placed to the side of the wheel, with the pivot point of the indicator in line with the arrow 39, the indicator housing being aligned with the center of the wheel. The operating arm 64 is perpendicularly related to the slide bar 34. Next the cross-sectional diameter of the tire is determined and the slide bar 34 graduation is set to the numeral on the slide bar corresponding to the cross-sectional diameter of the tire. This is necessary in order that dowel pin 87 carried by slide bar 34 will be positioned in a horizontal line extending along the inner side of the wheel in intersecting relation with the projected axis of the wheel spindle bolt, which line is parallel to the support assembly (see Fig. 6). Then an aperture in the connecting link 69 is selected having the same numeral as that to which the slide bar is set and in that hole the dowel pin 65 of the actuating arm 64 is positioned, with the aperture at the opposite end of link 69 resting over the dowel pin 87 of the slide bar 34. With the link 69 in place and the steering wheels set substantially straight-ahead, the linkage and indicator are adjusted so as to render the elements in perpendicular relation to each other with the pointer housing aligned with the center of the wheel and the pointer 55 on "zero." The pointer 55 pivots about its axis at an angle equal to the angular turning of the steering wheel about its spindle bolt. By turning the steering wheel, the linkage connected therewith effects pivoting of the pointer in a horizontal plane notwithstanding non-planar pivoting of the intermediate linkage, thus giving accurate indications of the angular turning of the steering wheel about its spindle bolt.

It will, of course, be understood that the steering angle indicating device may be employed by applying one device to each of the steering wheels of a vehicle. The steering wheels may then be turned and readings of the two indicators compared and tabulated, mechanical corrections being made as required.

The apparatus of the present invention may be employed with the camber caster device disclosed in detail and claimed in my Patent No. 2,627,123, issued February 3, 1953; the alignment indicating device disclosed and claimed in copending application Ser. No. 290,416, filed May 28, 1952, now Patent No. 2,737,728 and the tabulated results therefrom may be applied to the interpreter of my Patent No. 2,641,851, issued June 16, 1953.

I claim:

1. A steering angle indicating device comprising a support means including a pair of supporting elements, a support assembly, and means for supporting said support assembly in horizontal relationship on said elements, and clamping means for holding said support assembly in clamped relation to the wheel and tire of a vehicle, one end of said support assembly including upper and lower portions separated by a spacer element and joined together with said spacer element therebetween, one of said portions having a bent end which with the spacer element and adjoining upper and lower portions define a passageway, a transversely adjustable slide bar received in said passageway and having an upstanding pivot pin at one end thereof, the positioning of said slide bar being such that said pivot pin is located a distance apart from said support assembly equal to the distance between said support assembly and a point on the projected axis of the wheel spindle bolt in the approximate horizontal plane of the pivot pin an angle indicating instrument having a pointer and an actuating arm connected to the pointer, and means pivotally interconnecting said actuating arm with said pivot pin so that turning of the steering wheel to which the support assembly is attached effects corresponding pivoting of the indicator pointer.

2. A steering angle indicating device comprising a support means including a pair of supporting elements, an elongate support assembly, and means for supporting said support assembly horizontally across the outer side of a tire on a steering wheel on said elements, said support assembly having opposing ends including upper and lower spaced portions providing pairs of contact edges adapted to abut the side wall of the tire, clamping means for holding said support assembly in clamped relation to the tire, the upper and lower portions at one end of said support assembly being angulated and joined with a spacer element therebetween so as to define a passageway, a slide bar received in said passageway and adjustable transversely of the support assembly and having an upstanding pivot pin at one end thereof, means for securing the slide bar in a predetermined adjusted relation to and transversely of the support assembly so that when the device is set up for use said pivot pin is located a distance apart from said support assembly equal to the distance between said support assembly and a point on the projected axis of the wheel king pin in the approximate horizontal plane of the pivot pin, an angle indicating instrument having a pointer and an actuating arm connected to the pointer, and means pivotally interconnecting said actuating arm with said pivot pin so that turning of the steering wheel to which the support assembly is attached effects corresponding pivoting of the indicator pointer.

3. The steering angle indicating device as recited in claim 2, wherein said last mentioned means includes an elongated link having an apertured end portion adapted to be engaged on said pivot pin, the opposing end portion being adapted to be pivotally connected with the free end of said actuating arm.

4. The steering angle indicating device as recited in claim 2, wherein said last mentioned means includes an elongated angulated link having its end portions apertured, the free end of said actuating arm having an upstanding pin thereon, said link having its apertured end portions pivotally engaged one on the last named pin and the other on said pivot pin.

5. In a steering angle indicating device, an elongate supporting frame assembly having end portions including upper and lower bars connected together in spaced parallel relation and providing pardallel upper and lower contact edges adapted to position against a side wall of a tire across which the assembly is mounted for use, means carried by said opposing ends for clampingly securing the frame assembly to the running gear steerable wheels and tires of a vehicle, a slide bar supported by and transversely of one of said end portions of the assembly and having an upstanding pivot pin on one end thereof, means for securing said slide bar in a transversely adjusted position relative to the assembly, said slide bar having indicia thereon correlated to tire sizes whereby to facilitate positioning of said pivot pin in a predetermined operative relation with the king pin of a running gear steerable wheel, a steering angle indicating device adapted to be supported against movement at the side of the frame assembly remote from said wheel, a link disposed transversely of and substantially perpendicular to the frame assembly and having one end pivotally connected with said pivot pin, an actuating arm for said angle indicating device disposed in perpendicular relation with said link, a pivot coupling between one end of the actuating arm and the other end portion of said link, and means coupling the other end portion of said arm with said angle indicating device.

References Cited in the file of this patent
UNITED STATES PATENTS

| | | |
|---|---|---|
| 1,324,388 | Duby | Dec. 9, 1919 |
| 2,000,993 | Schmidt | May 14, 1935 |
| 2,346,360 | Creagmile | Apr. 11, 1944 |
| 2,522,066 | Smith | Sept. 12, 1950 |
| 2,624,123 | Wilkerson | Jan. 6, 1953 |